United States Patent [19]
Hirabayashi et al.

[11] Patent Number: 6,002,834
[45] Date of Patent: Dec. 14, 1999

[54] OPTICAL DISK HAVING TABLE RELATING SECTOR ADDRESS AND TIME AND OPTICAL DISK REPRODUCING APPARATUS

[75] Inventors: Masayuki Hirabayashi; Hideaki Suzuki; Masafumi Nakamura; Yutaka Nagai; Toshifumi Takeuchi, all of Yokohama, Japan

[73] Assignee: Hitachi, Ltd., Japan

[21] Appl. No.: 09/172,254

[22] Filed: Oct. 14, 1998

Related U.S. Application Data

[63] Continuation of application No. 08/932,585, Sep. 17, 1997, which is a continuation of application No. 08/595,789, Feb. 2, 1996, abandoned.

[30] Foreign Application Priority Data

Feb. 24, 1995 [JP] Japan .................................. 7-036461

[51] Int. Cl.$^6$ ........................................................ H04N 5/91
[52] U.S. Cl. ............................... 386/70; 386/82; 386/126
[58] Field of Search .............................. 386/68, 98, 109, 386/111, 119, 125, 126, 70

[56] References Cited

U.S. PATENT DOCUMENTS

| | | |
|---|---|---|
| 4,361,849 | 11/1982 | Bolger . |
| 5,122,875 | 6/1992 | Raychaudhuri et al. ............... 358/133 |
| 5,140,437 | 8/1992 | Yonemitsu et al. .................... 358/342 |
| 5,168,356 | 12/1992 | Acampora et al. .................... 358/133 |
| 5,187,697 | 2/1993 | Muramatsu et al. ................ 369/44.32 |
| 5,231,384 | 7/1993 | Kuriacose .............................. 358/141 |
| 5,241,526 | 8/1993 | Ishii ...................................... 369/124 |
| 5,351,132 | 9/1994 | Sawabe et al. ........................ 358/342 |
| 5,375,111 | 12/1994 | Ishida et al. .......................... 369/121 |
| 5,414,455 | 5/1995 | Hooper et al. ............................ 348/7 |
| 5,428,393 | 6/1995 | Encokida ............................... 348/390 |
| 5,450,209 | 9/1995 | Niimura et al. ....................... 358/335 |
| 5,455,684 | 10/1995 | Fujinami et al. ...................... 358/335 |
| 5,479,303 | 12/1995 | Suzuki et al. ......................... 360/72.2 |
| 5,535,008 | 7/1996 | Yamagishi et al. ................... 358/342 |
| 5,596,564 | 1/1997 | Fukushima et al. ................ 369/275.3 |
| 5,602,956 | 2/1997 | Susuki et al. ............................ 386/68 |
| 5,619,338 | 4/1997 | Nakai et al. ............................. 386/70 |
| 5,745,641 | 4/1998 | De Haan et al. ........................ 386/95 |

FOREIGN PATENT DOCUMENTS

| | | |
|---|---|---|
| 0570922A2 | 5/1993 | European Pat. Off. . |
| 0606157A2 | 1/1994 | European Pat. Off. . |
| 0606868A2 | 1/1994 | European Pat. Off. . |
| 0676895A2 | 4/1995 | European Pat. Off. . |
| 0695098A2 | 5/1995 | European Pat. Off. . |
| 0724264A2 | 1/1996 | European Pat. Off. . |
| 6268969 | 9/1994 | Japan . |
| 6276485 | 9/1994 | Japan . |

OTHER PUBLICATIONS

European Search Report Dated Oct. 17, 1996.

*Primary Examiner*—Thai Tran
*Assistant Examiner*—Vincent F. Boccio
*Attorney, Agent, or Firm*—Evenson, McKeown, Edwards & Lenaham, P.L.L.C.

[57] ABSTRACT

An optical disk recording thereon compressed moving picture data and an optical disk reproduction apparatus each capable of easily effecting trick play such as high speed reproduction and a retrieval operation at a high speed. Additional information necessary for trick play is recorded in an arbitrary area of an optical disk such as a TOC (Table of Contents) or a leading sector (sector 0) of the disk, and a sector address is added to each sector. To conduct trick play, an I picture, a P picture and a B picture contained in a GOP layer inside a bit stream of compressed image data are extracted and reproduced in accordance with a reproduction speed by looking up a trick play table.

11 Claims, 6 Drawing Sheets

| SECTOR ADDRESS | TIME CODE |
|---|---|
| 0 0 0 0 0 | 00 : 00 : 00 |
| 0 0 0 0 1 | 00 : 00 : 01 |
| 0 0 0 0 2 | 00 : 00 : 02 |
| 0 0 0 0 3 | 00 : 00 : 03 |
| . | . |
| . | . |
| . | . |

FIG. 1

| INDEX NO. | SECTOR ADDRESS |
|---|---|
| 1 | 0 0 0 0 0 |
| 2 | 0 0 0 1 F |
| 3 | 0 0 0 2 7 |
| 4 | 0 0 0 4 B |
| . | . |
| . | . |
| . | . |

FIG. 2

| SECTOR ADDRESS | TIME CODE |
|---|---|
| 0 0 0 0 0 | 00 : 00 : 00 |
| 0 0 0 0 1 | 00 : 00 : 01 |
| 0 0 0 0 2 | 00 : 00 : 02 |
| 0 0 0 0 3 | 00 : 00 : 03 |
| . | . |
| . | . |
| . | . |

FIG. 3

| SECTOR ADDRESS | CONTENT |
|---|---|
| 0 0 0 0 0 | CONTENT 1 |
| 0 0 0 0 1 | CONTENT 2 |
| 0 0 0 0 2 | CONTENT 3 |
| 0 0 0 0 3 | CONTENT 4 |
| . | . |
| . | . |
| . | . |

FIG. 4

| SH (SEQUENCE HEADER) | SECTOR ADDRESS |
|---|---|
| SH1 | 0 0 0 0 0 |
| SH2 | 0 0 0 1 F |
| SH3 | 0 0 0 2 7 |
| SH4 | 0 0 0 4 B |
| . | . |
| . | . |
| . | . |

FIG. 5

| I PICTURE | SECTOR ADDRESS |
|-----------|----------------|
| I1 | 0 0 0 0 0 |
| I2 | 0 0 0 1 F |
| I3 | 0 0 0 2 7 |
| I4 | 0 0 0 4 B |
| . | . |
| . | . |
| . | . |

FIG. 6A

TRACK — OPTICAL DISK

FIG. 6B

IDENTIFICATION CODE

| T1 | TABLE 1 | T2 | TABLE 2 | T3 | TABLE 3 |

## OPTICAL DISK HAVING TABLE RELATING SECTOR ADDRESS AND TIME AND OPTICAL DISK REPRODUCING APPARATUS

This application is a continuation of 08/923,585 filed Sep. 17, 1997, which is a continuation of 08/595,789 filed Feb. 2, 1996, now abandoned.

BACKGROUND OF THE INVENTION

This invention relates to an optical disk recording thereon compressed data of an image, and to an optical disk reproduction apparatus for reproducing the image data from the optical disk.

A so-called "CD-ROM" is a typical example of those systems which reproduce digital data by using an optical disk. The CD-ROM records data for a computer on an optical disk having the same physical format as CDs for audio use, and has the data format to be next described. A data string recorded on the optical disk comprises the smallest unit referred to as a "frame", and each frame contains digital data such as sync data, sub-code, main information and an error correction code.

Further, the CD-ROM employs the sector structure in which 98 frames (2,352 bytes) are gathered into 1 sector, and each sector comprises a 12-byte sync data, a 4-byte header data representing an address and a mode, a 2,048-byte digital data and a 288-byte error detection/correction code.

On the other hand, a system comprising the combination of an inter-frame prediction with orthogonal transform, quantitization and variable-length encoding is well known as an encoding system of moving picture, and an MPEG system of the ISO (International Organization of Standardization) is also based on this system. In the case of MPEG2, for example, the bit stream of the encoded image data is divided into six hierarchical layers, i.e. a sequence layer, a GOP (Group of Pictures) layer, a picture layer, a slice layer, a macro-block layer and a block layer. Among them, the GOP layer contains three kinds of data, that is, an I picture encoded from the information alone without using inter-frame prediction, a P picture generated by executing prediction from the I picture or P picture and a B picture generated by bidirectional prediction. The sequence layer comprises a GOP containing image data starting from the I picture and obtained by gathering the I picture, the P picture and B picture into one group, and an SH (Sequence Header) added to the leading part of the GOP.

When moving picture are converted to compressed image data by high efficiency encoding, there is known a system which encodes the signal by reducing a compression ratio for scenes having vigorous motion, or in other words, at a high transfer rate, and by increasing the compression ratio for scenes having small motion, or in other words, at a low transfer rate. The variable transfer rate compressed image data so encoded can reduce image deterioration due to compression in comparison with compressed image data of a fixed transfer rate obtained by fixing the compression ratio at a mean value.

An apparatus for recording the compressed image data having the variable transfer rate or the fixed transfer rate into the optical disk such as the CD-ROM and reproducing the data has been announced already.

SUMMARY OF THE INVENTION

The prior art technology described above does not particularly consider so-called "trick play" such as n-time speed variable speed reproduction with respect to standard speed reproduction or reverse reproduction of the image data recorded on the optical disk. In reproduction of the image data, for example, n-time speed variable speed reproduction or reverse reproduction is generally required besides continuous reproduction of a standard speed, and a reproduction apparatus which satisfies these requirements becomes necessary. High speed retrieval is also required for the retrieval operation.

It is an object of the present invention to provide an optical disk and an optical disk reproduction apparatus each of which can conduct various kinds of trick play of the optical disk recording thereon compressed image data, and can make a retrieval operation at a high speed.

To accomplish the object described above, the optical disk according to the present invention records specific information necessary for trick play into an arbitrary area such as a TOC (Table of Contents) or a leading sector (sector 0) of the optical disk, and adds a sector address to each sector.

The optical disk reproduction apparatus according to the present invention includes means for extracting and reproducing an I picture, a P picture and a B picture contained in a GOP layer inside a bit stream of compressed image data by looking up a trick play table.

After the optical disk is loaded to the optical disk reproduction apparatus, a system microcomputer first reads the trick play table recorded on the optical disk and stores it into a work area. When trick play is effected, the address of the sector to be read out is determined by looking up the necessary trick play table, and the address is retrieved on the optical disk so as to reproduce an image.

Because the address of the sector to be read out is determined by looking up the trick play table during trick play other than normal reproduction, trick play can be easily executed, and a retrieved reproduction image can be quickly obtained in the retrieval operation.

BRIEF DESCRIPTION OF THE DRAWINGS

FIG. 1 is a diagram showing a first embodiment of an optical disk according to the present invention;

FIG. 2 is a diagram showing a second embodiment of the optical disk according to the present invention;

FIG. 3 is a diagram showing a third embodiment of the optical disk according to the present invention;

FIG. 4 is a diagram showing a fourth embodiment of the optical disk according to the present invention;

FIG. 5 is a diagram showing a fifth embodiment of the optical disk according to the present invention;

FIGS. 6A and 6B are diagrams each showing a sixth embodiment of the optical disk according to the present invention;

DESCRIPTION OF THE PREFERRED EMBODIMENTS

Figure 7:
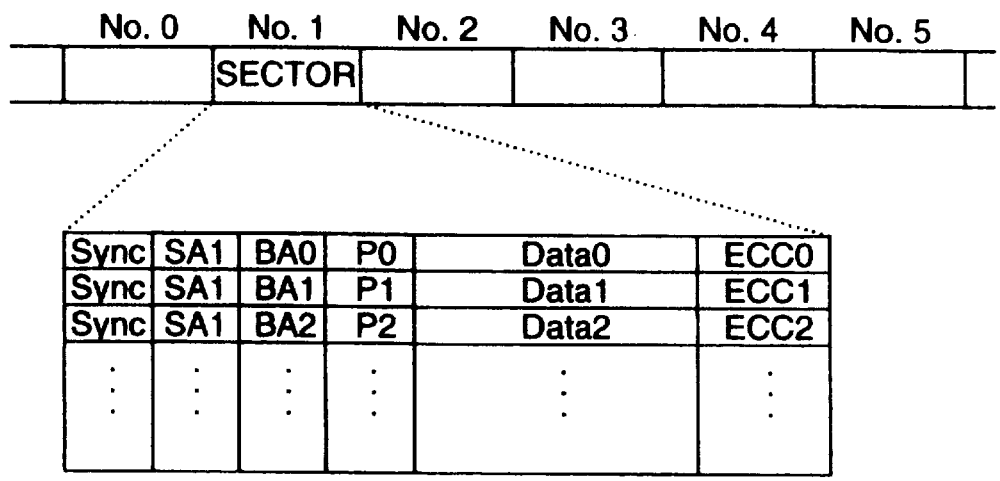
FIG. 7 is a schematic view showing a data format of the optical disk according to the seventh embodiment of the present invention.

Hereinafter, some preferred embodiments of the present invention will be explained with reference to the accompanying drawings. First, the embodiment shown in FIG. 1 will be explained.

FIG. 1 shows an optical disk according to the first embodiment of the present invention. The diagram shows a table for trick play on the optical disk. This trick play table records the numbers of pieces of music and movements (indices) and corresponding sector addresses for all the pieces and movements recorded on the optical disk, for example. Sector addresses are added to each sector of the optical disk, and this trick play table is recorded in an area such as a TOC (Table of Contents) or a leading sector (sector 0) of the disk.

When this optical disk is loaded to an optical disk reproduction apparatus, a system microcomputer first reads the trick play table and stores it in a work area. When trick play is effected, the address of the sector to be read out is determined by looking up this trick play table and is then retrieved on the optical disk so as to reproduce an image.

Because the address of the sector to be read out is determined by looking up the trick play table, retrieval can be carried out at a high speed.

FIG. 2 shows the optical disk according to the second embodiment of the present invention. The drawing shows the trick play table on the optical disk. The trick play table records all the sector addresses of the data recorded on the optical disk and the corresponding time codes. This trick play table is recorded in an area such as the TOC (Table of Contents) or the leading sector (sector 0) of the disk.

When this optical disk is loaded to the optical disk reproduction apparatus, the system microcomputer first reads the trick play table and stores it in the work area. When trick play is effected, the address of the sector to be read out is determined by looking up this trick play table, and the address is retrieved on the optical disk so as to reproduce the image.

Because the address of the sector to be read out is determined by looking up the trick play table during trick play other than normal reproduction, trick play can be easily conducted, and retrieval can be made at a high speed.

When compressed image data of a variable transfer rate is reproduced, the sector address cannot be determined from the time code because the sector address and the time code do not have a proportional relationship, and correct retrieval cannot be made. However, the corresponding sector address can be obtained by looking up the trick play table of this embodiment, and retrieval can be correctly made.

FIG. 3 shows the optical disk according to the third embodiment of the present invention. The drawing shows the trick play table on the optical disk. The trick play table records all the sector addresses of the data recorded on the optical disk and their contents. This trick play table is recorded in an area such as the TOC (Table of Contents) or the leading sector (sector 0) of the disk.

When the optical disk is loaded to the optical disk reproduction apparatus, the system microcomputer first reads the trick play table and stores it into the work area. When retrieval is effected, the address of the sector to be read out is determined by looking up the trick play table, and this address is retrieved on the optical disk so as to reproduce the image.

Because the address of the sector to be read out is determined by looking up the trick play table during trick play other than normal reproduction, trick play can be easily conducted and retrieval can be made at a high speed.

FIG. 4 shows the optical disk according to the fourth embodiment of the present invention. The drawing shows the trick play table on the optical disk. The trick play table records an SH (Sequence Header) added to the leading part of a GOP recorded on the optical disk and its sector address. This trick play table is recorded in an area such as the TOC (Table of Contents) or the leading sector (sector 0) of the disk.

When the optical disk is loaded to the optical disk reproduction apparatus, the system microcomputer first reads the trick play table and stores it in the work area. When retrieval is conducted, the address of the sector to be read out is determined by looking up the trick play table, and the address is retrieved on the optical disk so as to reproduce the image.

Because the address of the sector to be read out is determined by looking up the trick play table during trick play other than normal reproduction, trick play can be easily conducted and retrieval can be made at a high speed.

FIG. 5 shows the optical disk according to the fifth embodiment of the present invention. The drawing shows the trick play table on the optical disk. The trick play table records the sector addresses of the start and the end of an I picture recorded on the optical disk. This trick play table is recorded in an area such as the TOC (Table of Contents) or the leading sector (sector 0) of the disk.

When the optical disk is loaded to the optical disk reproduction apparatus, the system microcomputer first reads the trick play table and stores it into the work area. When retrieval is conducted, the address of the sector to be read out is determined by looking up this trick play table, and the address is retrieved on the optical disk so as to reproduce the image.

Because the sector address of the I picture is determined by looking up the trick play table during trick play other than normal reproduction, trick play can be made by extracting only the I picture. The sector addresses of a B picture and a P picture can be recorded in the trick play table, and trick play can be carried out smoothly.

FIGS. 6A and 6B show the optical disk according to the sixth embodiment of the present invention. FIG. 6A schematically shows the tracks on the optical disk. The tracks are spirally formed on the optical disk. FIG. 6B schematically shows a plurality of trick play tables 1, 2, 3 recorded in the tracks and their identification codes T1 T2, T3. When the optical disk is loaded to the optical disk reproducing apparatus, the system micro-computer reads the trick play tables recorded in the optical disk and stores them into the work area. In this instance, the system microcomputer can identify each trick play table by its identification code and can store it to a predetermined address of the work area. Therefore, even when any kinds of trick play tables exist, the system microcomputer can identify each table and can store it into the work table. In other words, the system micro-computer can determine the address of the sector by looking up a necessary trick play table during trick play and can easily effect trick play and at the same time, retrieval can be made at a high speed.

FIG. 7 shows the optical disk according to the seventh embodiment of the present invention. FIG. 7 schematically shows the data format recorded in the track on the optical disk. Each sector is further divided into blocks. The blocks contain a sync signal (Sync), a sector address (SA), a block address (BA), a parity (P), digital data (Data) and an error correction code (ECC). The same address is recorded for each block for the sector address.

Figure 8:
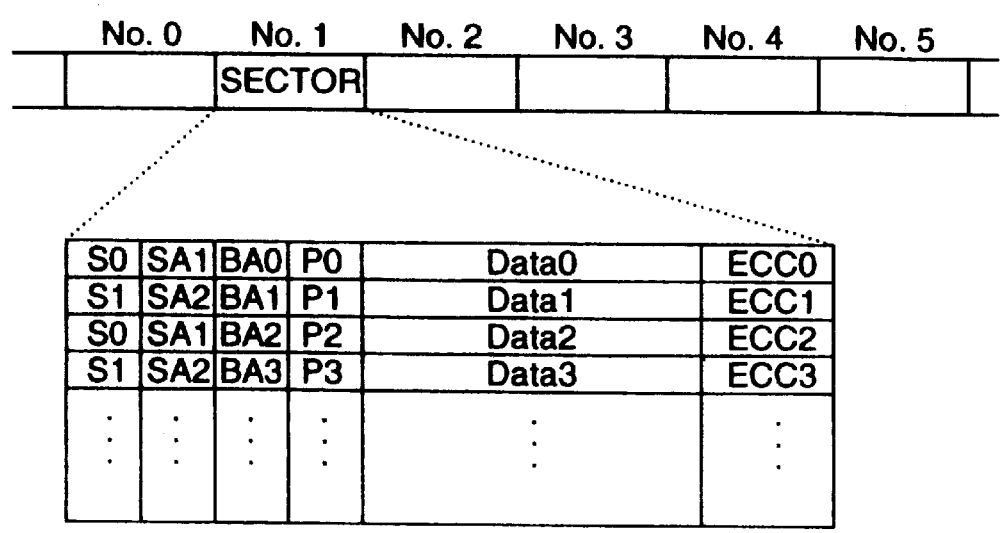
FIG. 8 is a schematic view showing the data format of the optical disk according to the eighth embodiment of the present invention.

FIG. 8 shows the optical disk according to the eighth embodiment of the present invention. FIG. 8 schematically shows the data format recorded in the tracks on the optical disk, and each sector is further divided into blocks. The blocks contain the sync signals (S0, S1), the sector address (SA), the block address (BA), the parity (P), the digital data (Data) and the error correction code (ECC). The sector address is recorded in two blocks and SA1 and SA2 together represent one address. Therefore, in comparison with the seventh embodiment wherein the same address is written for each block, the sector address may be written into every two blocks, and redundancy of the address is smaller and the address area can be made smaller than in the seventh embodiment.

Figure 9:
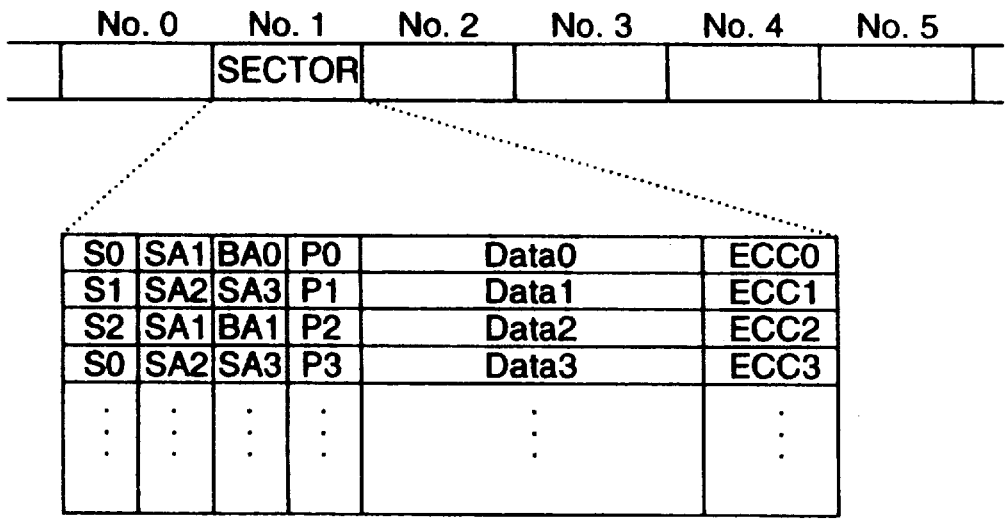
FIG. 9 is a schematic view showing the data format of the optical disk according to the ninth embodiment of the present invention.

FIG. 9 shows the optical disk according to the ninth embodiment of the present invention. FIG. 9 schematically show the data format recorded in the tacks on the optical disk. Each sector is further divided into blocks. The blocks contain the sync signals (S0, S1, S2), the sector address (SA), the block address (BA), the parity (P), the digital data (Data) and the error correction code (ECC). The sector address is recorded into two blocks, and SA1, SA2 and SA3 together represent one address. Therefore, the same block address may be written into every two blocks. Accordingly, redundancy of the address is smaller and the address area can be made smaller than in the seventh and eighth embodiments.

Figure 10:
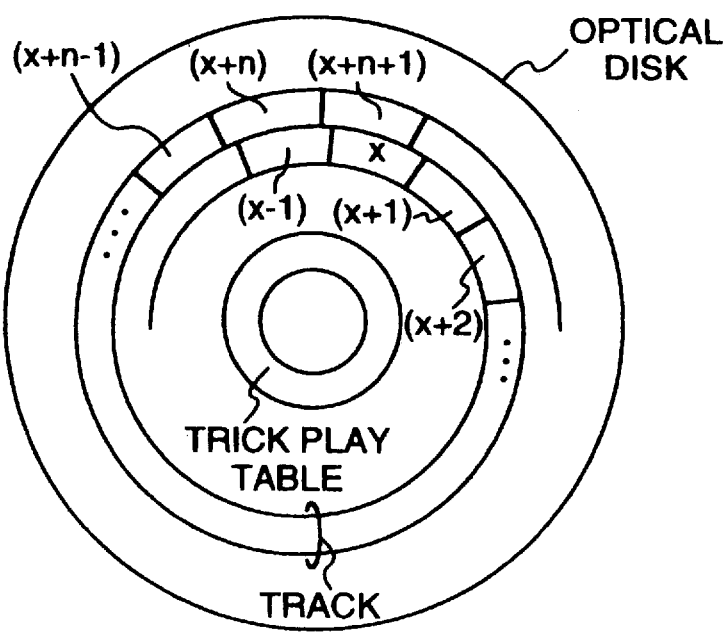
FIG. 10 is a schematic view of tracks on an optical disk according to the present invention.

FIG. 10 schematically shows the tracks on the optical disk, and the spiral track is formed on the optical disk. Symbols (x−1), x, (x+1), . . . , (x+n) and (x+n+1) represent sectors, respectively, and the data are reproduced in this sequence during normal reproduction.

Hereinafter, the trick play operation will be explained about the operation at the time of reproduction at an n-time reproduction speed. It will be assumed that a command of reproduction at an n-time is inputted while the sector x is being reproduced in FIG. 10. First, after the data of the sector x is read out, (x+n) as the next target sector is retrieved by track jump, or the like. The distance n from the initial position to the target sector is calculated by the system microcomputer in accordance with at which multiple speed the reproduction is to be made. After retrieval is so made, the data of the sector (x+n) is read out and (x+2n) as the next target sector is again retrieved. Therefore, this operation is repeatedly carried out.

When the optical disk is loaded to the optical disk reproduction apparatus, the system microcomputer first reads the trick play table recorded on the optical disk and stores it into the work area. When trick play is conducted, the address of the sector to be read out is determined by looking up the necessary trick play table, and its address is retrieved on the optical disk so as to reproduce the image.

Figure 11:
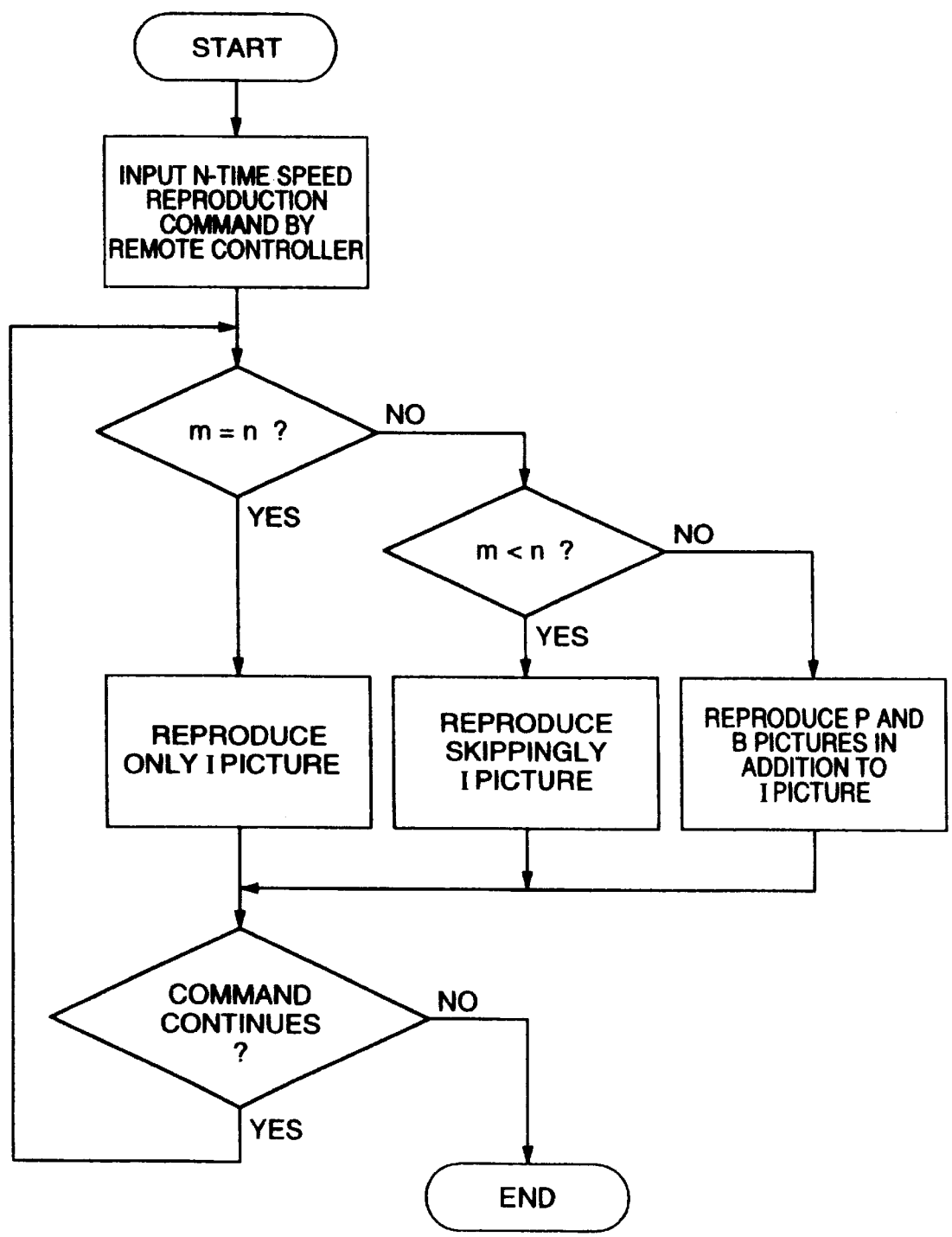
FIG. 11 is a flowchart of an operation at the time of trick play.

FIG. 11 shows the flowchart of the operation during the n-time speed reproduction described above. Here, symbol m represents a frame (field) interval of the I picture. When the command of n-time speed reproduction is inputted from an external input device such as a remote controller, whether the relation m=n is first judged. When the result is m=n, only the I picture is retrieved by the trick play table and reproduction is carried out. When the result is m<n, the I picture is skippingly retrieved and reproduced by the trick play table. When the result is b 2m=n, 3m=n, and so forth, only the I picture is retrieved and reproduced. When the P picture is further retrieved and reproduced skippingly in addition to the I picture at this time, various speed reproduction can be made smoothly. When the result is m>n, the P picture is skippingly retrieved and reproduced by the trick play table in addition to the I picture. When the B picture is further retrieved and reproduced skippingly in addition to the I picture and the P picture at this time, various speed reproduction can be smoothly made. Thereafter, the operation described above is repeated if the n-time speed reproduction continues.

Though the explanation given above deals with the n-time speed reproduction operation, the present invention can be easily applied to reproduction in the reverse direction when n in the n-time speed reproduction is negative (−). Further, slow reproduction can be made when |n|<1.

As described above, when retrieval is made by looking up the trick play table, image reproduction of the GOP unit can be easily made in the image data encoded by the MPEG system, for example. Therefore, besides the normal speed continuous reproduction operation, operations trick play such as slow reproduction, high speed reproduction, reproduction in the reverse direction, and the high speed retrieval operation become possible.

The present invention is not particularly limited to the foregoing embodiments but can be changed or modified in various ways without departing from the scope thereof.

In the optical disk according to the present invention, information necessary for trick play is recorded in an arbitrary area such as the TOC (Table of Contents) or the leading sector (sector 0) of the disk, and the sector address is added to each sector. The optical disk reproduction apparatus looks up the trick play table, and extracts and reproduces the I picture, P picture and B picture contained in the GOP layer inside the bit stream of the compressed image data. Accordingly, the present invention can easily execute trick play such as slow reproduction, high speed reproduction, reproduction in the reverse direction and the retrieval operation. It is obvious in the explanation given above that the image data may be the moving picture or the still picture. It is further obvious that the present invention can be similarly applied to the audio data or control data carried by the image data.

What is claimed is:

1. An optical disk having recorded thereon main information which consist of several sectors, and a sector address recorded in each of the respective sectors, wherein:

said main information includes at least compressed image data having a variable transfer rate;

said optical disk has a table which contains information correlating said sector addresses and presentation times of the compressed data, a relationship between said sector addresses and said presentation times being inconstant; and image data associated with a desired presentation time can be selectively reproduced by looking up the table correlating said sector addresses and said presentation time.

2. A computer readable medium encoded with a data structure comprising:

main information arranged in a plurality of sectors, said main information including at least compressed image data having a variable transfer rate;

a sector address recorded in each of the respective sectors of said main information; and a table which contains information correlating said sector addresses with timing information of the compressed data, a relationship between said sector addresses and said timing information being inconstant;

wherein image data associated with a desired timing can be selectively reproduced by looking up information in said table correlating said sector addresses and said timing information.

3. The computer readable medium according to claim 2 wherein said timing information comprises a presentation time of compressed image data contained in each sector of said main information.

4. The computer readable medium according to claim 2 wherein said computer readable medium is an optical disk.

5. A method of recording image data in a computer readable medium, comprising:

arranging said image data in sectors;

recording sectors of said image data in said computer readable medium, in a compressed data format having a variable transfer rate;

recording a sector address in each of said sectors in said computer readable medium; and recording in said computer readable medium a table containing information correlating said sector addresses and timing information of the compressed image data, a relationship between said sector addresses and said timing of the compressed image data being inconstant;

wherein compressed image data associated with a desired timing can be selectively reproduced by looking up information in said table correlating said sector addresses and said timing information.

6. The method according to claim 5 wherein said timing information comprises a presentation time of compressed image data contained in each sector of said image data.

7. The method according to claim 5 wherein said computer readable medium is an optical disk.

8. An optical disk reproducing apparatus for reproducing image data from the optical disk having said image data recorded therein, wherein:

said image data has been recorded a plurality of sectors arranged on said optical disk and a sector address recorded in each of the respective sectors;

said image data includes at least compressed image data having a variable transfer rate;

said optical disk has a table recorded therein, which the table contains information correlating said sector addresses and presentation times of the compressed data, a relationship between said sector addresses and said presentation times being inconstant; and image data associated with a desired presentation time can be selectively reproduced by looking up a corresponding sector address in the table correlating said sector addresses and said presentation times.

9. A method for reproducing information from an optical disk containing image data arranged in sectors, each of which sectors has a respective sector address, said image data being recorded in a compressed data format having a variable transfer rate; and a table which contains information correlating said sector addresses and timing information of compressed image data recorded on the optical disk, a relationship between said sector addresses and said timing information being inconstant, said method comprising:

reading a particular sector address from said table corresponding to image data for a desired presentation time;

reading image data from said sector having the particular sector address; and reproducing said image data that is read.

10. The method according to claim 9 wherein said timing information comprises a presentation time of compressed image data contained in each sector of said image data.

11. The method according to claim 9 wherein said computer readable medium is an optical disk.

* * * * *

UNITED STATES PATENT AND TRADEMARK OFFICE
CERTIFICATE OF CORRECTION

PATENT NO. : 6,002,834
DATED : December 14, 1999
INVENTOR(S) : Masayuki Hirabayashi et al It is certified that error appears in the above-identified patent and that said Letters Patent is hereby corrected as shown below:

IN THE CLAIMS:

Please delete Claims 5-7 and 9-11.

Signed and Sealed this

Twenty-seventh Day of March, 2001

Attest:

NICHOLAS P. GODICI

*Attesting Officer*    *Acting Director of the United States Patent and Trademark Office*